Figure 1:
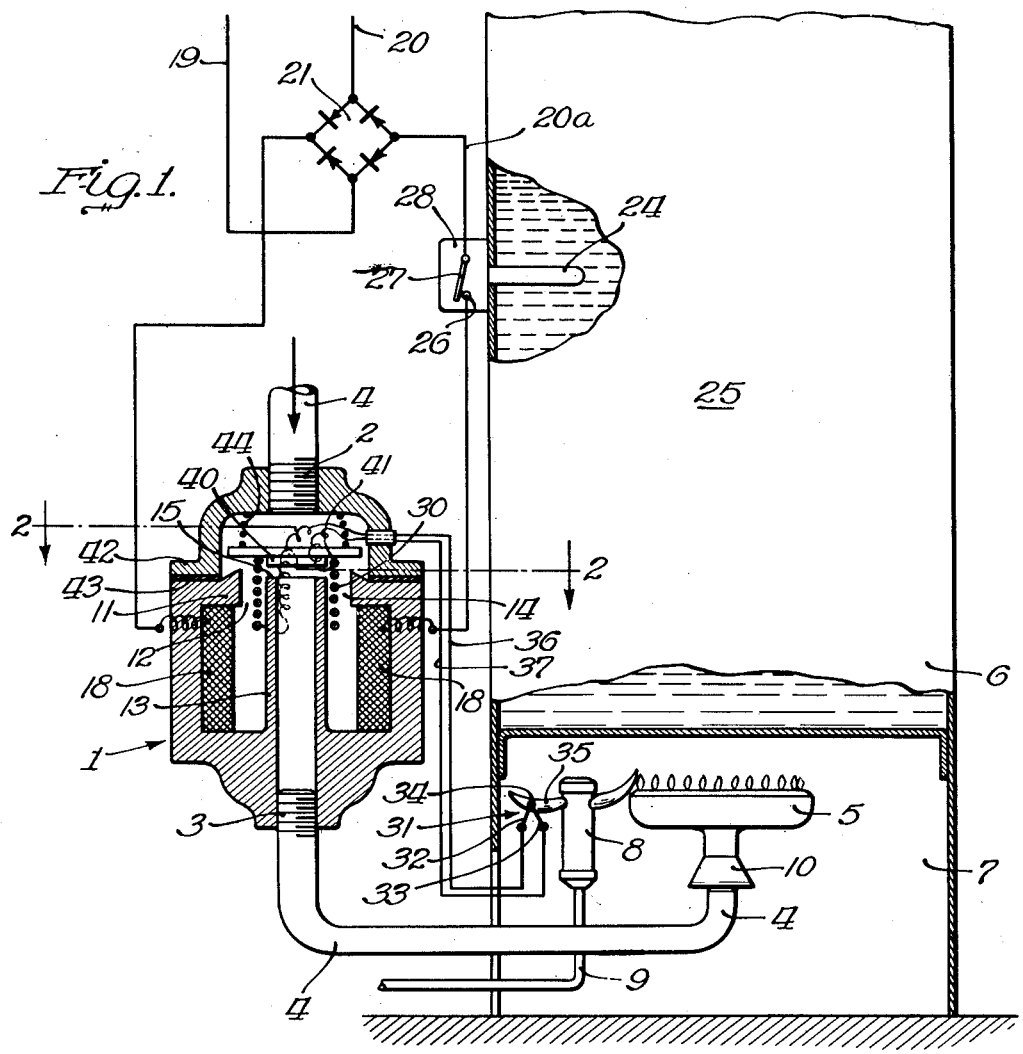

May 7, 1957  R. B. MATTHEWS  2,791,394
CONTROL DEVICE FOR FLUID FUEL BURNING APPARATUS AND THE LIKE
Filed Aug. 18, 1952

INVENTOR.
Russell B. Matthews
BY
[signature]
Attys.

United States Patent Office 2,791,394
Patented May 7, 1957

2,791,394

CONTROL DEVICE FOR FLUID FUEL BURNING APPARATUS AND THE LIKE

Russell B. Matthews, Wauwatosa, Wis., assignor to Milwaukee Gas Specialty Company, Milwaukee, Wis., a corporation of Wisconsin Application August 18, 1952, Serial No. 304,910

7 Claims. (Cl. 251—137)

This invention relates, in general, to control devices, and has particular relation to an improved control device for controlling the flow of fluids such as the flow of fluid fuel for fluid fuel burning apparatus and the like.

The present application is a continuation-in-part of my copending application Serial No. 121,817, filed October 17, 1949, now Patent No. 2,637,343, granted May 5, 1953.

While I have shown and shall describe herein the control device of the present invention as applied for operating a valve member for controlling the flow of fluid fuel to a main burner of a water heater, it is to be understood that the invention is not, in its broader aspects, limited to such use but may be employed for all similar purposes, for example, for operating valves for other apparatus or for operating other devices.

Thermoelectric safety devices are now well known on the market and are frequently used in systems for controlling the fuel supply to burners, these devices being of the type that maintain a valve in open position for flow of fuel to the burner as long as the constantly burning flame of a pilot or ignition burner generates thermoelectric current by heating a thermoelectric generator. On failure of the pilot burner flame, the thermoelectric current decreases due to cooling of the thermoelectric generator, and the safety device is thereupon actuated to effect movement of the fuel valve to its closed position to interrupt or shut off the fuel supply.

In automatic apparatus such, for example, as automatic appliances for water heaters and the like, means are usually provided for automatically controlling the flow of fuel to a main burner responsive, for example, to changes in temperature or similar condition.

One of the main objects of the present invention is to provide an improved form of control device wherein the temperature or other condition responsive control may be obtained without thermostat or other condition responsive contacts in circuit with the low voltage thermoelectric generator.

Another object is to provide an improved form of control device wherein the thermostat or other condition responsive contacts may be connected in circuit with a relatively higher voltage circuit such, for example, as an external circuit of from approximately 20 to 115 volts. This is advantageous in that it makes possible the use of a conventional thermostat or other conventional condition responsive device to provide the desired automatic control responsive to changes in temperature or similar condition.

Another object is to provide an improved form of control device of the character described which has implicit therein a fail-safe aspect in that if the source of small electric energy fails (i. e., if a pilot burner which heats a thermoelectric generator to provide the desired small electric energy is extinguished) the apparatus automatically shuts off, for example, the flow of fuel to the main burner thereby providing a safety function for the main burner similar to that afforded by a thermoelectric safety shut-off for the main burner and at the same time affording temperature or condition responsiveness without the necessity of other control devices in the fuel stream.

Another object is to provide a compact and efficient control device which lends itself to economical fabrication and affords maximum operating force or torque at the start of the movement as distinguished from devices in which the force exerted initially is a minimum. This is advantageous in that it provides a large initial or starting force for overcoming the inertia and friction of the moving parts and a strong initial force which, for example, will overcome fluid pressures in "cracking" or opening a valve wherein the controlled fluid, such as gas for a gas heater, usually tends to hold the valve closed.

Another object is to provide a device of the character described which may use alternating current as commonly supplied for lighting purposes or an alternating current of from approximately 20 to 115 volts.

Another object is to provide for actuating, for example, a valve member for controlling flow of fluid upon change in temperature or other condition but only during the flow of a first current such, for example, as the thermoelectric current generated by heating a thermoelectric generator, by generating a first magnetic field by the flow of the first current, generating by the flow of another current a second magnetic field in opposition to the first magnetic field, and actuating the valve or other member by the reaction between the first and second magnetic fields.

Another object is to provide for actuating a thermoelectric device upon the occurrence of a change in temperature or other condition but only during the flow of a first current such, for example, as the thermoelectric current generated by heating a thermocouple, by generating a first magnetic field by the flow of the first current, generating by the flow of another current a second magnetic field in opposition to the first magnetic field, and actuating the device by the reaction between the first and second magnetic fields.

Another object is to provide an improved form of control device of the character described including a first winding for connection with a first source of electric energy which winding when energized is adapted to produce a first magnetic field; a coil movable in the magnetic field; a second source of electric energy such, for example, as a single thermocouple or a thermopile connected in circuit with the coil for energizing the same— the coil being wound so that the magnetic field generated by energization of the coil by the second source of electric energy opposes the first magnetic field to impart movement to the coil and there being a controlling member connected to the coil for movement therewith to control a flow of fluid by the movement of the controlling member.

Further objects and advantages and numerous adaptations of the invention will appear from the following detailed description taken in connection with the accompanying drawings it being understood that the invention is limited only within the scope of the appended claims and not to the particular embodiment selected for illustration.

Figure 2:
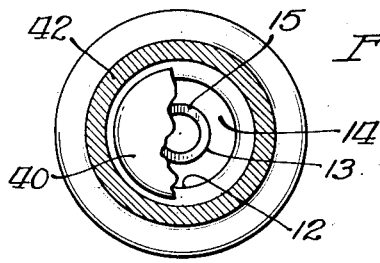

In the drawings:

Figure 1 illustrates somewhat schematically a temperature control apparatus embodying the present invention with the control device in axial section; and Figure 2 is a sectional view taken on the line 2—2 of Figure 1.

Referring now to the drawings, the embodiment of the invention therein illustrated comprises a valve body 1 having a gaseous fuel inlet 2 and a gaseous fuel outlet 3. Contiguous sections of the gaseous fuel supply pipe 4 are connected to the inlet 2 and outlet 3. The section connected to the outlet 3 leads, for example, to the main burner 5 of a water heater 6 as shown in the drawing or to the main burner of a space heater or other fuel burning apparatus. The burner 5 is located within the burner chamber 7 at the bottom of the particular heater 6 selected for illustration.

A pilot burner 8 is located within the chamber 7 in juxtaposition to the main burner 5 to maintain a constantly burning pilot burner flame for igniting the main burner. The pilot burner 8 is supplied with gaseous fuel by a pilot burner fuel supply pipe 9 which may be connected, for example, to receive fuel from the gaseous fuel supply pipe 4 anterior of the automatic or condition responsive valve member to be presently described. The delivery of gaseous fuel from the pipe 4 to the main burner 5 may be by way of a mixing chamber 10 to which air is admitted through adjustable air inlets (not shown) as well understood in the art.

The valve body 1 includes a magnetic frame which for purposes of illustration is shown as constituting the wall of the valve body 1. The magnetic frame is preferably formed of iron, steel or other suitable magnetic material. The magnetic frame includes a wall 11 provided with an opening 12 and a tubular part 13 which extends into the opening 12 and has its outer periphery spaced from the inner periphery of the wall 11 to provide a radial space annularly between the part 13 and wall 11 which forms an annular air gap 14. The tubular part 13 which may constitute the gaseous fuel outlet 3 has a valve seat 15 at the upper end thereof as the device is shown in the drawings.

Disposed within the magnetic frame 1 is a winding 18 which when energized is adapted to produce magnetic flux across and a high magnetic flux density in the air gap 14. The winding or field coil 18 is connected to an alternating current power line 19, 20 directly or through a low voltage transformer, through, for example, a dry disc rectifier 21 of the full wave type. It is the flow of rectified alternating current through the winding or coil 18 which produces the high flux density in the air gap 14. The alternating current line 19, 20 may, for example, be of from approximately 20 to 115 volts although this is merely illustrative and not limiting.

The temperature or condition responsive means is shown as a thermostat comprising, for example, a temperature responsive thermostat or condition responsive part 24 projecting, for example, into the interior of the water compartment 25 of the tank of the water heater 6. The thermostat or condition responsive device 24 also includes a contact 26 and a coacting contact 27 which is moved into and out of contact with the contact 26 by changes in temperature of the water or other medium or by changes in other condition. The contacts 26 and 27 are connected in circuit, for example, with the lead 29a supplied with electric energy from the power line 19, 20 and may be enclosed within an enclosure 28 mounted, for example, on the outer side of the water heater 6. When the water temperature rises sufficiently to satisfy the thermostat 24, the contact 27 separates from the contact 26 and opens the circuit between the power line 19, 20 and the winding 18. On the other hand, when the water temperature does not satisfy the thermostat 24 (i. e., when the thermostat is calling for heat) the contact 27 moves into contact with the contact 26 and closes the energizing circuit for the winding 18. The disposition of the contacts 26 and 27 in the energizing circuit for the winding 18 makes possible the use of a conventional thermostat or other condition responsive device to control the operation of the valve.

A coil 30 is located for movement in the annular air gap 14 and is energized, for example, by a source of small electric energy such as a single thermocouple 31 or a thermopile or the like. The thermocouple or thermoelectric generator 31 is located within the burner compartment 7 and comprises dissimilar thermocouple elements 32 and 33 joined at 34 to form a "hot" junction which is positioned to be heated by the pilot burner flame 35. One element 32 of the thermoelectric generator 31 is connected, for example, by a conductor 36 to one end of the movable coil 30 and the opposite end of coil 30 is connected to the other element 33, for example, by a conductor 37.

A valve member 40 coacts with the movable coil 30, for example, by connecting it to the coil at 41 for movement axially or vertically as the device is shown in Figure 1 to open position removed from the valve seat 15 when the coil 30 is energized, for example, by the thermoelectric generator 31 and the winding 18 is energized, for example, by the power line 19, 20 as will presently appear. The movable coil 30 is wound so that the magnetic field generated by the flow of thermoelectric current through the coil 30 opposes the magnetic field or magnetic flux produced across the air gap 14 by energization of the winding 18 and imparts axial movement to the coil 30 in a direction to move the valve member 40 to open position. The upper part of the valve body 1 may be in the form of a removable cover 42 secured in place, for example, by screws (not shown) screwed into the valve body 1 preferably with sealing means 43 interposed therebetween to render the connection gastight. The valve member 40 may be biased to closed position, for example, by the weight thereof and/or by a spring 44 interposed, for example, between the valve member 40 and the cover 42.

The operation of the illustrated embodiment of the invention is as follows:

In condition where either the winding 18 or the coil 30 is unenergized or in condition where both winding 18 and coil 30 are unenergized, the valve member 40 is biased to closed position against the valve seat 15 and shuts off the flow of fuel to the main burner 5.

Assuming that the pilot burner 8 is ignited and that the thermoelectric generator 31 is heated and energizing the coil 30, when the circuit to the external source of electric energy is closed, for example, by closing of contacts 27, 26 upon the thermostat 24 calling for heat, the winding 18 is energized. The winding 18 then generates magnetic flux across the air gap 14 which is opposed by the magnetic field generated by the flow of thermoelectric current through the coil 30. This generates a force which moves the coil 30 upwardly as the device is shown in Figure 1 and the valve member to open position for flow of gaseous fuel to the main burner 5 where it is ignited by the pilot burner 8.

The maximum opening force is imparted to the valve member 40 at the beginning of the repulsion of the coil 30 in valve opening direction. This maximum initial force as previously set forth is advantageous in overcoming the inertia and friction of the moving parts and in overcoming fluid pressures in "cracking" or opening the valve member 40 where as in the illustrated embodiment of the invention the controlled fluid tends to hold the valve closed. The device of the present invention is also sensitive and quick operating in valve opening direction.

When the temperature, for example, of the water has increased sufficiently to satisfy the thermostat 24, the contact 27 separates from the contact 26 thereby opening the energizing circuit for the winding 18 and deenergizing this winding. The winding 18 then ceases to generate magnetic flux across the air gap 14 and the valve member 40 moves to closed position against the valve seat 15 and shuts off the flow of fuel to the main burner 5.

If at any time the flame of the pilot burner 8, which normally should burn constantly, becomes extinguished, thereby creating an unsafe condition, the thermocouple 31 will be deenergized and the flow of energizing thermoelectric current through the coil 30 will be discontinued. When this occurs, the coil 30 is deenergized and ceases to generate opposing magnetic flux and the valve member 40 moves to closed position against the valve seat 15 to shut off the supply of fuel to the main burner 5.

It will thus be apparent that if either of the coils or windings 18 and 30 is deenergized, the related magnetic field will be removed and the valve member 40 will close to shut off the supply of fuel to the main burner. In other words, the device requires the presence of both magnetic fields and the opposition of one to the other to open and maintain the valve member in open position. This provides an improved form of control device for automatically controlling the flow of fuel to a main burner responsive, for example, to changes in temperature or similar condition and which at the same time has implicit therein a fail-safe aspect. The automatic and fail-safe aspects are both accomplished without the necessity of other control devices in the fuel stream, i. e., by the single valve member 40.

It will be noted that when either or both coil 30 and winding 18 are deenergized with accompanying movement of valve member 40 to closed position the valve member 40 by its connection to the coil 30 maintains the coil 30 in proper position in the air gap 14 for subsequent actuation in the manner hereinbefore described. Where the upper part of the valve body is in the form of a removable cover 42, this cover may be formed of suitable non-magnetic material.

The embodiment of the invention shown in the drawings is for illustrative purposes only and it is to be expressly understood that said drawings and the accompanying specification are not to be construed as a definition of the limits or scope of the invention, reference being had to the appended claims for that purpose.

I claim:

1. In a control device of the character described, in combination, a control body having an outer circumferentially complete magnetic wall closed at one end by a first connected magnetic end wall, a second end wall connected to the opposite end of said outer wall and extending inwardly to an opening therethrough, a magnetic tubular part defining a fuel outlet passage and connected to said first end wall and extending into said opening and having a valve seat at its inner end, a winding disposed within and completely enclosed by said outer wall and at one end by said first end wall and which winding when energized is effective to produce a magnetic field in the opening in said second end wall, a coil surrounding said tubular part and movable in the opening in said second end wall, a removable non-magnetic cover attached to said control body outwardly of said second end wall, said cover having a fuel inlet and defining a chamber, a first source of small electric energy connected in circuit with said coil for energizing same, said coil being wound so that the magnetic field generated by energization of said coil by said first source of electric energy opposes said first magnetic field to impart movement to said coil, a valve member biased to a closed position against said valve seat and coacting with said coil for movement in said chamber and from said valve seat by repulsion and with maximum force upon initial movement of said coil, and a second source of larger electric energy connected in circuit with said winding for energizing said winding to produce said first magnetic field and of sufficiently large electric energy to overcome larger resistances in the circuit connections between said second source and said winding than could be overcome by the electric energy of said first source.

2. A control device comprising, in combination, a control body having a tubular magnetic outer wall closed at one end by a first connected magnetic wall, a second end wall connected to the opposite end of said outer wall and extending inwardly to an opening therethrough, a tubular magnetic part defining an outlet passage and connected to said first end wall, said part extending coaxially of said opening and having a valve seat at its inner end, a non-magnetic cover closing said control body outwardly of said second wall, said cover defining a fuel inlet, a valve member biased to a closed position with respect to said valve seat, magnetic field producing means within said outer wall effective to produce a first magnetic field in the opening in said second end wall, and a coil surrounding said tubular part and movable in the opening in said second end wall, said coil coacting with said valve to move said valve therewith from said seat and against said bias in response to energization of said coil by a current producing a magnetic field about said coil acting in opposition to said first magnetic field.

3. A control device comprising, in combination, a control body having a tubular magnetic outer wall closed at one end by a first connected magnetic wall, a second end wall connected to the opposite end of said outer wall and extending inwardly to an opening therethrough, a tubular magnetic part defining an outlet passage and connected to said first end wall, said part extending coaxially of said opening and having a valve seat at its inner end, a non-magnetic cover removably closing said control body outwardly of said second wall, said cover defining a chamber and having a fuel inlet, a valve member movable within said chamber and biased to a closed position with respect to said valve seat, magnetic field producing means within said outer wall effective to produce a first magnetic field in the opening in said second end wall, and a coil surrounding said tubular part and movable in the opening in said second end wall, said coil coacting with said valve to move said valve therewith from said seat and against said bias in response to energization of said coil by a current producing a magnetic field about said coil acting in opposition to said first magnetic field.

4. A control device comprising, in combination, a control body having a tubular magnetic outer wall closed at one end by a first connected magnetic wall, a second end wall connected to the opposite end of said outer wall and extending inwardly to an opening therethrough, a tubular magnetic part defining an outlet passage and connected to said first end wall, said part extending coaxially of said opening and having a valve seat at its inner end, a non-magnetic cover closing said control body outwardly of said second wall, said cover defining a fuel inlet, a valve member biased to a closed position with respect to said valve seat, a winding disposed within said outer wall and which when energized is effective to produce a first magnetic field in the opening in said second end wall, and a coil surrounding said tubular part and movable in the opening in said second end wall, said coil coacting with said valve to move said valve therewith from said seat and against said bias in response to energization of said coil by a current producing a magnetic field about said coil acting in opposition to said first magnetic field.

5. A control device comprising, in combination, a control body having a tubular magnetic outer wall closed at one end by a first connected magnetic wall, a second end wall connected to the opposite end of said outer wall and extending inwardly to an opening therethrough, a tubular magnetic part defining an outlet passage and connected to said first end wall, said part extending coaxially of said opening and having a valve seat at its inner end, a non-magnetic cover removably closing said control body outwardly of said second wall, said cover defining a chamber and having a fuel inlet, a valve member movable within said chamber and biased to a closed position with respect to said valve seat, a winding disposed within said outer wall and which when energized is effective to produce a first magnetic field in the opening in said second end wall, and a coil surrounding said tubular part and movable in the opening in said second end wall, said coil coacting with said valve to move said valve therewith from said seat and against said bias in response to energization of said coil by a current producing a magnetic field about said coil acting in opposition to said first magnetic field.

6. A control device comprising, in combination, a control body having a tubular magnetic outer wall closed at one end by a first connected magnetic wall, a second end wall connected to the opposite end of said outer wall and extending inwardly to an opening therethrough, a tubular magnetic part defining an outlet passage and connected to said first end wall, said part extending coaxially of said opening and having a valve seat at its inner end, a non-magnetic cover closing said control body outwardly of said second wall, said cover defining a fuel inlet, a valve member biased to a closed position with respect to said valve seat, a winding disposed within said outer wall and which when energized is effective to produce a first magnetic field in the opening in said second end wall, a coil surrounding said tubular part and movable in the opening in said second end wall, said coil coacting with said valve to move said valve therewith from said seat and against said bias in response to energization of said coil by a current producing a magnetic field about said coil acting in opposition to said first magnetic field, a first source of small electric energy connected in circuit with said coil for energizing the same, and a second source of larger electric energy connected in circuit with said winding for energizing the latter and of sufficiently larger electric energy to overcome larger resistances in the circuit connections between said second source and said winding than could be overcome by the electric energy of said first source.

7. A control device comprising, in combination, a control body having a tubular magnetic outer wall closed at one end by a first connected magnetic wall, a second end wall connected to the opposite end of said outer wall and extending inwardly to an opening therethrough, a tubular magnetic part defining an outlet passage and connected to said first end wall, said part extending coaxially of said opening and having a valve seat at its inner end, a non-magnetic cover removably closing said control body outwardly of said second wall, said cover defining a chamber and having a fuel inlet, a valve member movable within said chamber and biased to a closed position with respect to said valve seat, a winding disposed within said outer wall and which when energized is effective to produce a first magnetic field in the opening in said second end wall, a coil surrounding said tubular part and movable in the opening in said second end wall, said coil coacting with said valve to move said valve therewith from said seat and against said bias in response to energization of said coil by a current producing a magnetic field about said coil acting in opposition to said first magnetic field, a first source of small electric energy connected in circuit with said coil for energizing the same, and a second source of larger electric energy connected in circuit with said winding for energizing the latter and of sufficiently large electric energy to overcome larger resistances in the circuit connections between said second source and said winding than could be overcome by the electric energy of said first source.

References Cited in the file of this patent

UNITED STATES PATENTS

| | | |
|---|---|---|
| 473,538 | Weston | Apr. 26, 1892 |
| 1,249,654 | Muller | Dec. 11, 1917 |
| 1,606,571 | Heising | Nov. 9, 1926 |
| 1,834,995 | Bathrick | Dec. 8, 1931 |
| 1,937,602 | Stewart | Dec. 5, 1933 |
| 2,263,819 | Ray | Nov. 25, 1941 |
| 2,292,478 | Ray | Aug. 11, 1942 |
| 2,306,578 | Wetzel | Dec. 29, 1942 |
| 2,390,985 | Boyer | Dec. 18, 1945 |
| 2,531,824 | Paille | Nov. 28, 1950 |
| 2,548,235 | Olson | Apr. 10, 1951 |
| 2,649,767 | Matthews | Aug. 25, 1953 |